E. FOX.
Apparatus for Disintegrating Grain and Distilling Spirits.
No. 216,841.   Patented June 24, 1879.
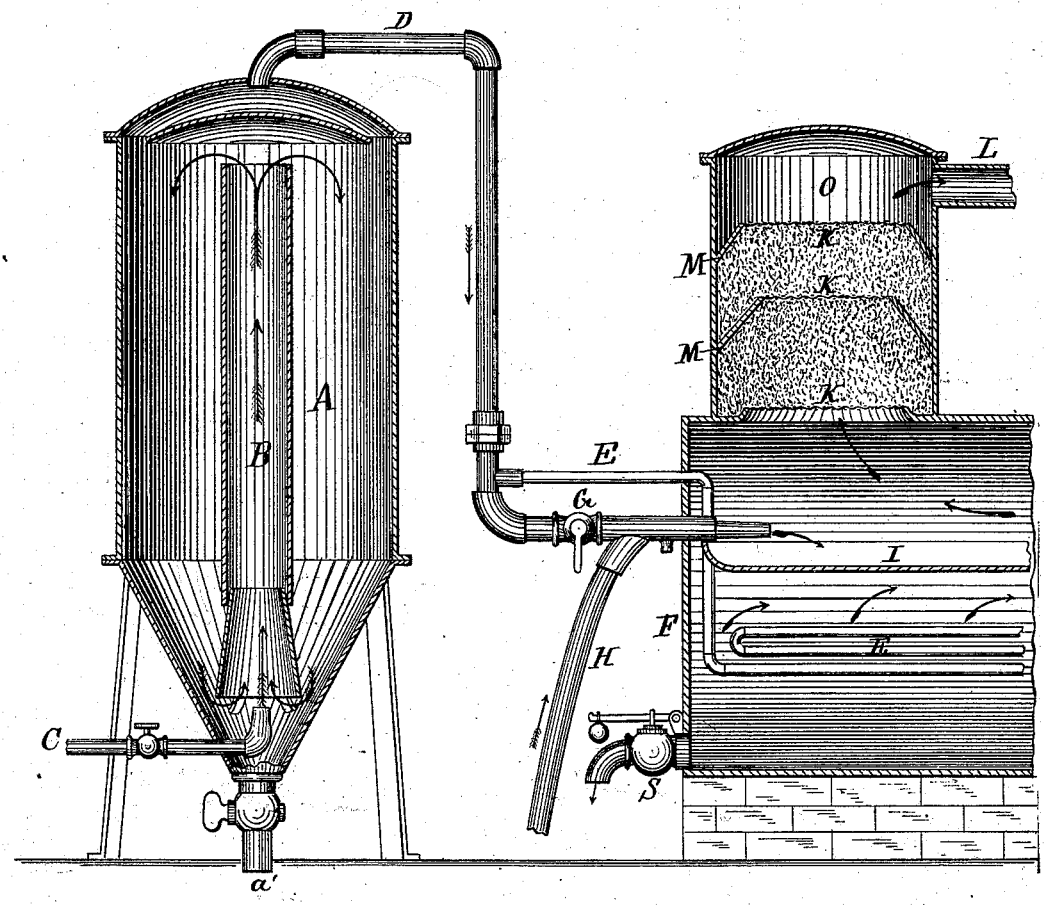

UNITED STATES PATENT OFFICE.

EDWARD FOX, OF BROOKLYN, NEW YORK.

IMPROVEMENT IN APPARATUS FOR DISINTEGRATING GRAIN AND DISTILLING SPIRITS.

Specification forming part of Letters Patent No. 216,841, dated June 24, 1879; application filed March 31, 1879.

*To all whom it may concern:*

Be it known that I, EDWARD FOX, of Brooklyn, in the county of Kings and State of New York, have invented a new and Improved Apparatus for Disintegrating Grain and Distilling and Rectifying Spirits, of which the following is a specification.

The drawing represents a sectional elevation of the apparatus.

The object of this invention is to prepare grain for the mash-tub by a method superior to grinding, and to distill the mash and rectify the high wines.

The invention consists in combining, with the mash-tub and still, a steam-pipe, injector, mash-pipe, and pan, and in combining with the still a dome having a pipe leading to condenser, perforated trays, and gutters, as hereinafter described.

A is a cylindrical vessel, having a conical bottom, to which is attached a pipe, $a'$, furnished with a cock, and having also a removable top or cover, which is preferably rounded. Fixed vertically in the center of this vessel is a tube, B, expanded at the lower end, and reaching within a short distance of the bottom and top. The steam-pipe C is entered into the vessel A near its bottom and pointed upward under the tube B. The corn or other cereal to be treated is then placed within the vessel A, and steam at a high pressure is turned on through the pipe C. The result is, that the grain is thrown by the pressure of the steam up through the tube B, to be expelled at its top in the direction of the arrows, to fall and be again carried up, as indicated, and this operation and circulation is continued as long as may be desirable.

When the grain has become, through this operation, sufficiently digested or disintegrated, the cock in the pipe $a'$ is opened, and the whole mass is discharged into the mash-tub, which may be situated in any convenient position relative to the vessel A. Throughout this operation the steam from the vessel A is allowed to escape through the pipe D and a portion of it into the pipe E, which enters the still F, and is coiled therein, as shown; but the main portion of the steam is made to pass through the continuation of the pipe D and the injector G, which is attached thereto; and by this means it is made to draw through the pipe H the mash that is to be distilled or rectified, and inject it at a temperature of about 140° Fahrenheit upon the evaporating-pan I, that is placed within the still F.

The heat from the coiled pipe E and from the steam entering with the mash or high wines causes their evaporation or distillation, the products of which pass up through the woven-wire or perforated trays K K and their contents, that are set in the dome or filtering-chamber O of the still, and thence through the pipe L to the condenser. Fixed within this dome or filtering-chamber are the annular gutters M M, upon which rest the perforated trays. The spaces between these trays are filled with charcoal or other suitable deodorizer, and at the same time some substance for flavoring it may be mixed with or placed upon the upper portion of the charcoal filter; and the annular rings will, it is found, receive and retain a considerable portion of the fusel-oil and other impurities that are separated from the distillate on its passage through the dome or filtering-chamber.

The still need never be allowed to become filled with the mash or high wines, for they may be supplied only as fast as they can be evaporated; and the safety-valve S may be so arranged as to relieve the still of the condensed steam and other substances, such as fusel-oil, &c., and maintain a constant level of its contents.

This method results in extracting from the crude spirits, &c., the acids, ethers, and essential oils which deteriorate the products.

This system of rectifying reduces the usual several operations to one, and allows the production at a low cost of fine liquors, spirits, &c. It also reduces the machinery of distilleries, which is now so costly.

The apparatus is not limited in power or capacity, and it greatly lessens the usual loss by evaporation. It effects a more perfect extraction of fusel-oil, and it permits the effective treatment of a greater quantity of spirits in a given time, than is possible by the old method.

The advantages of the injector are, that in the case of distilling from grain, &c., it allows a circulation to be continually kept up in the disintegrator. It supplies the still with a continuous and regular quantity of fermented wort. It introduces the wort at almost the evaporating-point into the still, as required.

In rectifying crude spirits, the injector supplies the still with the high wines to be rectified, and allows pressure to be used, if required, without causing a high degree of heat, which would otherwise occur.

The injector and still can be used with or without the disintegrator.

Having thus fully described my invention, I claim as new and desire to secure by Letters Patent—

1. The combination, with the mash-tub A B and still F, of the steam-pipe E, injector G, pipe H, and pan I, as shown and described.

2. In combination with the still F, the dome O, having pipe L, leading to condenser, and the perforated trays K and the gutters M, as shown and described.

EDWARD FOX.

Witnesses:
SAMUEL P. BELL,
CHARLES H. DICKINSON.